UNITED STATES PATENT OFFICE.

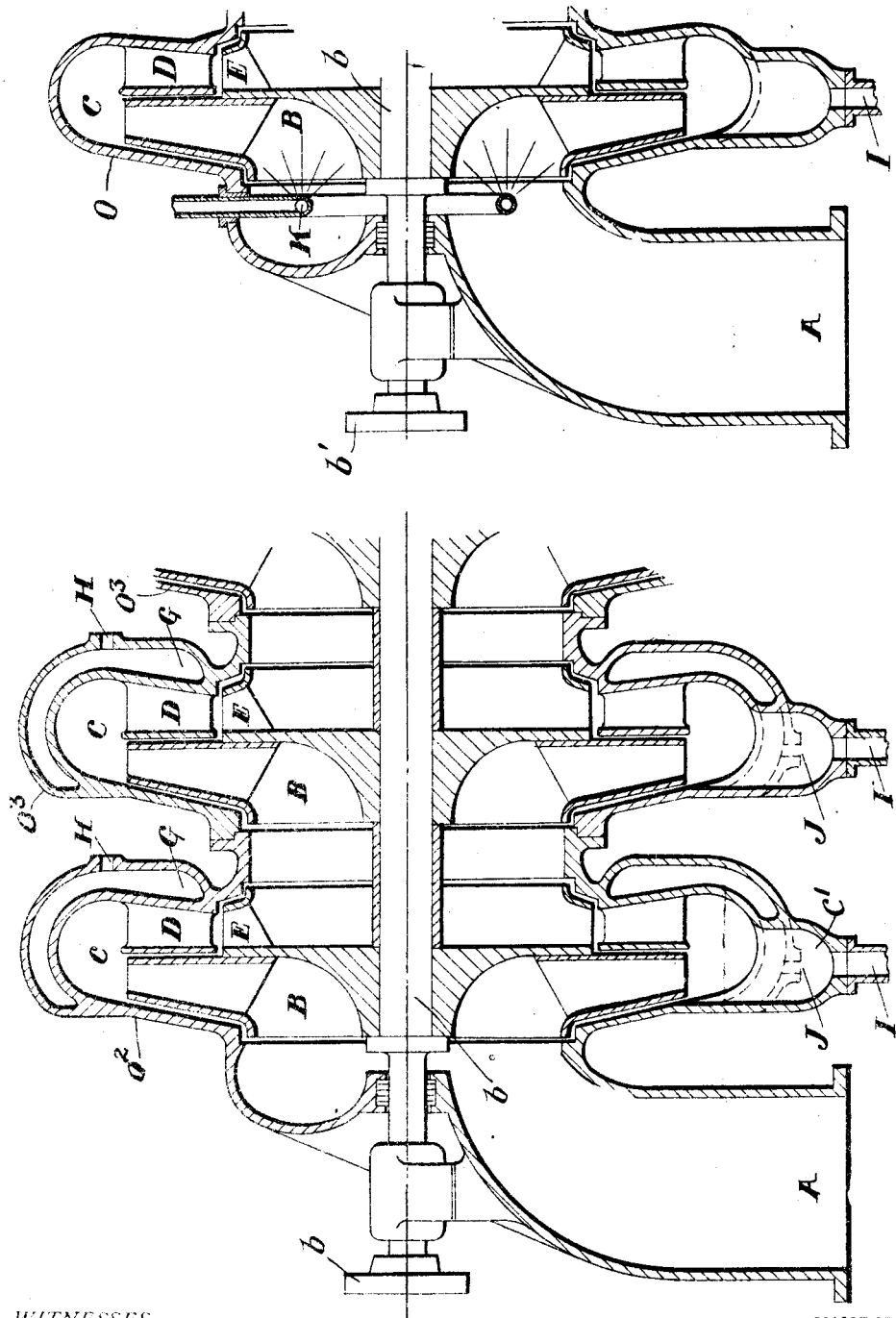

AUGUSTE C. E. RATEAU, OF PARIS, FRANCE, ASSIGNOR TO RATEAU BATTU SMOOT COMPANY, OF NEW YORK, N. Y., A CORPORATION OF NEW YORK.

MEANS FOR PURIFYING ELASTIC FLUIDS.

1,184,261.   Specification of Letters Patent.   Patented May 23, 1916.

Application filed April 16, 1914. Serial No. 832,288.

*To all whom it may concern:*

Be it known that I, AUGUSTE C. E. RATEAU, a citizen of the Republic of France, residing in Paris, France, have invented certain new and useful Improvements in Means for Purifying Elastic Fluids, of which the following is a true and exact description, reference being had to the accompanying drawings, which form a part thereof.

My present invention consists in improved means for purifying elastic fluids. Heretofore, fans and centrifugal compressors have been found very useful in separating tar and dust particles out of gases in which such particles are held in suspension. In order to purify a gas in this manner, it is necessary for the fan or compressor to impart a certain velocity of movement to the gas, but as the gas delivered by the purifying apparatus must ordinarily be utilized at a pressure but little, if any, above that at which the gas passes to the apparatus, a portion of the velocity imparted to the gas is ordinarily lost, and in some cases all of this velocity is lost, thus involving a certain waste of energy.

The primary object of my present invention is to reduce the amount of energy thus lost. This I accomplish by passing the gas, after its delivery from the fan or compressor and after the purification for which velocity has been imparted to the gas is effected, through a turbine, which abstracts and utilizes some of the energy of velocity of the gas, so that I thereby recover a portion of the energy imparted to the gas by the fan or compressor. My present invention consists in suitable apparatus for treating gas in the manner described.

The various features of novelty which characterize my invention are pointed out with particularity in the claims annexed to and forming a part of this specification. For a better understanding of the invention, however, and of the advantages possessed by it, reference should be had to the accompanying drawings and descriptive matter in which I have illustrated and described various forms in which my invention may be embodied.

Figure 1:
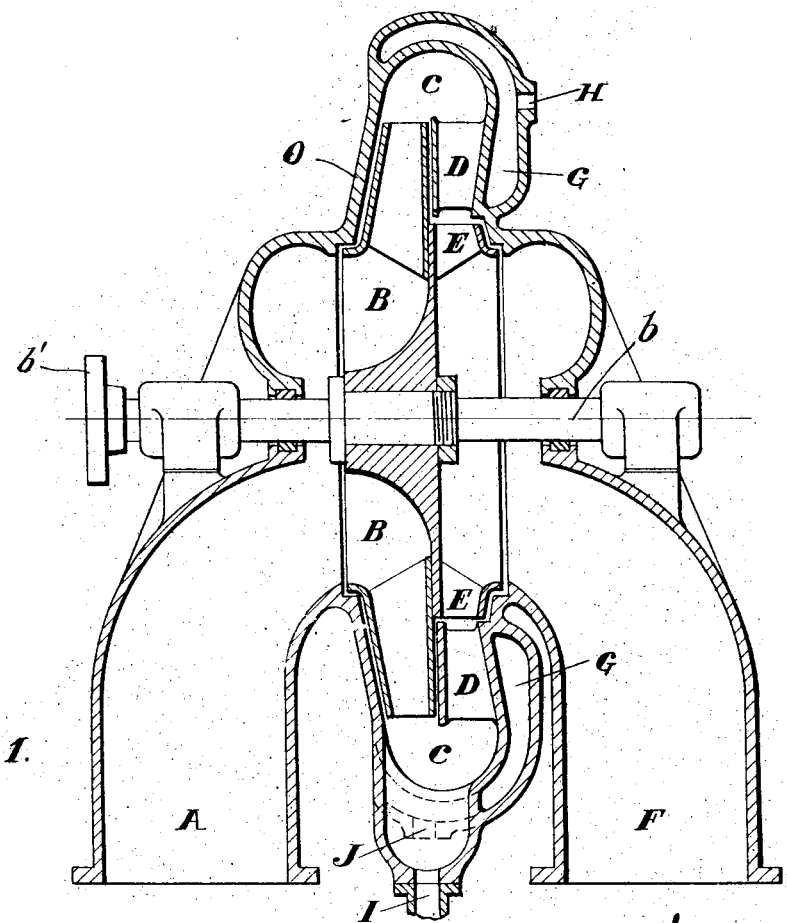
Figure 2:
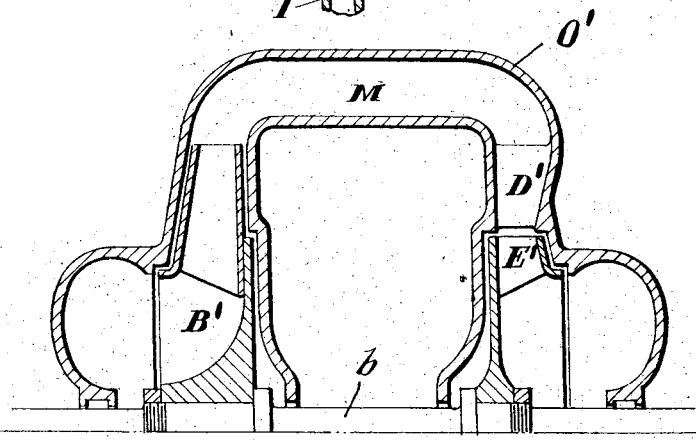

Of the drawings: Figure 1 is a sectional elevation of one form of apparatus constructed in accordance with the present invention; Fig. 2 is a partial sectional elevation of a modified form of apparatus; Fig. 3 is a sectional elevation of apparatus differing from that shown in Fig. 1 in having several fan and turbine wheel elements connected in series; and Fig. 4 is a partial sectional elevation of apparatus differing from that shown in Fig. 1 by the addition of liquid jets for separating dust from the gas.

The gas purifying apparatus shown in Fig. 1 comprises a casing O formed with an inlet A through which the gas to be purified passes to the fan wheel B. The gas passing through the fan wheel B is discharged at the periphery of the latter into an annular chamber C wherein the tarry, dust or like particles are separated from the gas. The gas passes from the chamber C through stationary nozzles D, which direct the gas into the buckets of a turbine wheel E fixed to the back of the fan wheel in any suitable manner. F is the outlet for the purified gas.

The action of the fan on the gas is to increase its velocity and, as the direction of velocity of the gas is altered in the chamber C, the relatively heavy tarry and dust particles are thrown by centrifugal action to the periphery of the chamber C, and eventually fall into the lower part of this chamber. The nozzles D which are substituted for the diffusor commonly used in fans, are so arranged that there is no transformation of the energy of velocity of the gas into energy of pressure produced in the passage of the gases through the nozzles D which always gives rise to a considerable loss in energy.

The turbine utilizes the energy of velocity abstracted from the gases in the best possible manner, for the power furnished by the turbine is directly utilized in driving the fan, and is to be subtracted from the power which it would otherwise be necessary to impart to the fan from the external driving element (not shown in the drawings) which may be connected to the coupling part $b'$ carried by the shaft $b$ of the fan. In the practical use of my invention, the motive power which must be furnished to the shaft of the fan by the external driving element is lowered by as much as one-third or one-quarter from that which would be necessary without the use of the turbine wheel referred to above. The turbine wheel in my apparatus will ordinarily bring the pressure of the gas at the outlet of the apparatus to an approximate equality with the pressure of the gas before it entered the apparatus. It will be obvious however that the exhaust pressure of the gas can be brought to any predetermined value at which it is desired to use the gas and in all cases the turbine should be designed, of course, to give the desired delivery pressure.

Instead of making the turbine wheel integral with the fan, as shown in Fig. 1, the fan and turbine may quite as well be made independent, provided they remain fixed to the same shaft. The separation of the turbine and fan wheels is advantageous when it is desired to use a cylindrical or slightly conical annular chamber between the outlet of the fan proper and the inlet of the turbine wheel. Such a construction is shown in Fig. 2, wherein the casing O' is formed with the annular chamber M between the fan outlet from the fan B' and the nozzles D' leading to the inlet to the turbine wheel E'. In passing through this chamber the gas rotates, thus giving an increased opportunity for separating the dust or other matters held in suspension in the gas. While it is possible to mount the turbine wheel and fan in separate casings, this arrangement is, generally speaking, less advantageous than the arrangement of the turbine and fan in the same casing. It is possible also to have the turbine and fan connected to separate shafts, but in this case the power recovered in the turbine is not directly utilized in reducing the power from an external source which it is necessary to apply to the shaft of the fan in order to drive the latter.

When the apparatus is used to extract tar or analogous products from the gas, there is a tendency for solidified particles to gather in consecutive layers in the interior of the chamber C, the removal of which requires the scraping of the inner wall of the chamber from time to time. On account of the interruption in the service, and the labor cost which this scraping involves, it should be avoided if possible. In order to avoid an inconvenience of this kind, steam has heretofore been injected into gas boosters to melt the tar thus collecting. A preferable means for accomplishing a similar result is to surround each chamber C in which tar or analogous matter is separated from the gas by a hot fluid jacket G, as shown in Figs. 1 and 3. Steam or other suitable hot fluid employed enters the jacket G through the opening H and the water of condensation or cooled heating fluid passes out of the jacket through the orifice J. The melted tar collecting in the bottom of the chamber C, passes out of the latter through the orifice I which should open into the usual water reservoir or tar seal, if it is desired that the extraction of tar from the apparatus be automatic.

It will be understood, of course, that if a more perfect purification of the gas is desired than can be obtained by the use of a single fan wheel, a plurality of fan wheels may be connected in series with one or more single or multiple wheel turbines, and in Fig. 3 I have shown apparatus differing from that shown in Fig. 1 in that the casing $O^2$ is formed with a plurality of purifying chambers C in connection with each of which there is a corresponding rotary element comprising a fan wheel B and turbine wheel E.

The fan and turbine wheel arrangements may well be the same where dust particles are to be removed from the gas as where tarry and like liquid impurities are to be removed from the gas, but in order to obtain a better separation of the dust particles, water may be injected into the gas passing through the fan at any suitable point. One arrangement for this purpose is shown in Fig. 4, wherein a perforated pipe K is shown for discharging water under pressure into the gas at the inlet to the fan wheel B. The dust agglomerates under the action of the water, and the water and dust are thrown to the periphery of the chamber C by centrifugal force and the water and dust are both discharged through the orifice I.

My invention is especially useful in chemical works, and in drying and treating lighting gases, and the gases from blast furnaces and gas and coke works, and, generally speaking, in all industries producing a gas charged with solid or liquid matters held in suspension.

While in accordance with the provisions of the statutes, I have illustrated and described the best forms of my invention now known to me, it will be apparent to those skilled in the art that changes may be made in the forms of apparatus disclosed without departing from the spirit of my invention.

Having now described my invention, what I claim as new and desire to secure by Letters Patent, is:

1. Gas purifying apparatus comprising in combination, a fan wheel and a turbine wheel mounted on the same shaft, and a casing in which said wheels are mounted, said casing being formed with an inlet passage through which the gas to be purified passes to the fan, a purifying chamber in which the gas delivered by the fan has its direction of movement altered and in which non-gaseous particles are separated from the gas, and nozzles for directing the gas leaving said chamber into the turbine wheel and an outlet for the purified gas.

2. Gas purifying apparatus comprising in combination, a fan wheel and a turbine wheel mounted on the same shaft, and a casing in which said wheels are mounted, said casing being formed with an inlet passage through which the gas to be purified passes to the fan, a purifying chamber in which the gas delivered by the fan has its direction of movement altered and in which non-gaseous particles are separated from the gas, nozzles for directing the gas leaving said chamber into the turbine wheel and an outlet for the purified gas, and means for injecting liquid into the gas.

3. Gas purifying apparatus comprising in combination, a fan wheel and a turbine wheel mounted on the same shaft, and a casing in which said wheels are mounted, said casing being formed with an inlet passage through which the gas to be purified passes to the fan, a purifying chamber in which the gas delivered by the fan has its direction of movement altered and in which non-gaseous particles are separated from the gas, and nozzles for directing the gas leaving said chamber into the turbine wheel and an outlet for the purified gas, said purifying chamber being surrounded by a heating jacket and being formed with an outlet for escape of melted impurities collecting at the bottom of said purifying chamber.

4. Gas purifying apparatus comprising in combination, means for utilizing mechanical energy in imparting energy of velocity to the gas, means for altering the direction of flow of the gas to which velocity has been imparted in order to separate non-gaseous particles therefrom, and means for abstracting some of the energy of velocity of the gas and utilizing the energy abstracted in performing useful work.

5. Gas purifying apparatus comprising in combination, mechanical means for imparting energy of velocity to the gas to be purified, means for altering the direction of flow of the gas to which velocity has been imparted in order to separate non-gaseous particles therefrom, and means for abstracting some of the energy of velocity of the gas and utilizing the energy abstracting in operating said mechanical means.

6. Gas purifying apparatus comprising in combination, a plurality of fan wheels and one or more turbine wheels mounted on the same shaft and a casing inclosing said wheels and provided with ports, chambers and nozzles for causing the gas treated to pass through the different wheels receiving energy from said fan wheels and imparting energy to said turbine wheels said chambers including one or more in which the gas has its direction of velocity altered in order to effect a separation of non-gaseous particles.

7. Gas purifying apparatus comprising in combination, a plurality of elements mounted on the same shaft and each comprising a fan wheel and a turbine wheel, and a casing inclosing said elements and comprising means whereby the gas to be treated is caused to flow through said elements successively passing from the fan wheel of each element to the turbine wheel thereof through a chamber in which the velocity of the gas is altered and through nozzles directing the gas into the turbine wheel.

AUGUSTE C. E. RATEAU.

Witnesses:
   Chas. P. Pressly,
   Albert Nunes.